(12) United States Patent
Amano

(10) Patent No.: US 11,380,919 B2
(45) Date of Patent: Jul. 5, 2022

(54) FUEL GAS SUPPLY CONTROL DEVICE, FUEL GAS SUPPLY CONTROL METHOD, AND METHOD OF STARTING FUEL-CELL VEHICLE

(71) Applicant: TOYOTA JIDOSHA KABUSHIKI KAISHA, Toyota (JP)

(72) Inventor: Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 194 days.

(21) Appl. No.: 16/511,225

(22) Filed: Jul. 15, 2019

(65) Prior Publication Data

US 2020/0067116 A1 Feb. 27, 2020

(30) Foreign Application Priority Data

Aug. 27, 2018 (JP) .............................. JP2018-158559

(51) Int. Cl.
*H01M 8/04* (2016.01)
*H01M 8/04746* (2016.01)
(Continued)

(52) U.S. Cl.
CPC ......... *H01M 8/04753* (2013.01); *B60L 50/70* (2019.02); *B60L 58/30* (2019.02);
(Continued)

(58) Field of Classification Search
CPC ......... H01M 8/04753; H01M 8/04388; H01M 8/04201; H01M 8/04947; H01M 8/04664;
(Continued)

(56) References Cited

U.S. PATENT DOCUMENTS 4,002,429 A * 1/1977 Bartovsky .............. G01N 27/16
422/96
2009/0031784 A1 * 2/2009 Koda ..................... G01N 27/16
73/23.31
(Continued)

FOREIGN PATENT DOCUMENTS

JP 2004-239548 8/2004
JP 2006-339080 12/2006
(Continued)

OTHER PUBLICATIONS

Macias et al. "Gas sensor measurements during the initial action period of duty-cycling for power saving." Sensors and Actuators B 239 (2017) 1003-1009 (Year: 2017).*

*Primary Examiner* — Michael L Dignan
(74) *Attorney, Agent, or Firm* — Finnegan, Henderson, Farabow, Garrett & Dunner, LLP

(57) ABSTRACT

When starting of a fuel gas consuming device configured to consume a fuel gas is instructed, an electric power is supplied to a fuel gas sensor that has a predetermined unstable period until an accuracy of fuel gas detection reaches a predetermined level after having been supplied with electric power, supply of the fuel gas from a fuel gas supply device to the fuel gas consuming device is started by opening an electric valve that is electrically opened and shut off. When a signal from the fuel gas sensor exhibits behavior of approaching a predetermined determination threshold value before the unstable period has elapsed, the electric valve is shut off. When the signal from the fuel gas sensor is less than a predetermined determination value in a predetermined period after the electric valve has been shut off, the electric valve is opened.

9 Claims, 8 Drawing Sheets

(51) Int. Cl.
*H01M 8/0438* (2016.01)
*H01M 8/04082* (2016.01)
*H01M 8/04858* (2016.01)
*H01M 8/04664* (2016.01)
*H01M 8/04955* (2016.01)
*B60L 50/70* (2019.01)
*B60L 58/31* (2019.01)
*B60L 58/30* (2019.01)
*H01M 8/04302* (2016.01)

(52) U.S. Cl.
CPC ......... *B60L 58/31* (2019.02); *H01M 8/04201* (2013.01); *H01M 8/04302* (2016.02); *H01M 8/04388* (2013.01); *H01M 8/04664* (2013.01); *H01M 8/04947* (2013.01); *H01M 8/04955* (2013.01); *H01M 2250/20* (2013.01)

(58) Field of Classification Search
CPC ......... H01M 8/04955; H01M 8/04302; H01M 2250/20; H01M 8/04298; H01M 8/04089; B60L 50/70; B60L 58/31; B60L 58/30; B60L 3/0053; G01N 27/16
See application file for complete search history.

(56) References Cited

U.S. PATENT DOCUMENTS

2010/0291451 A1* 11/2010 Tamura ............ H01M 8/04768
429/429
2018/0335411 A1* 11/2018 Zanella, Sr ............ G01N 27/16

FOREIGN PATENT DOCUMENTS

JP 2008-096267 4/2008
JP 2010-019754 A 1/2010

* cited by examiner

FUEL GAS SUPPLY CONTROL DEVICE, FUEL GAS SUPPLY CONTROL METHOD, AND METHOD OF STARTING FUEL-CELL VEHICLE

INCORPORATION BY REFERENCE

The disclosure of Japanese Patent Application No. 2018-158559 filed on Aug. 27, 2018 including the specification, drawings and abstract is incorporated herein by reference in its entirety.

BACKGROUND

1. Technical Field

The disclosure relates to a fuel gas supply control device, a fuel gas supply control method, and a method of starting a fuel-cell vehicle.

2. Description of Related Art

In the related art, a hydrogen detector that detects hydrogen is used for fuel-cell vehicles and the like. A hydrogen detector has been used for the purpose of detecting leakage of hydrogen and closing a main stop valve just below a hydrogen supply device such as a hydrogen tank to prevent leakage of hydrogen in addition to the purpose of detection of an amount of hydrogen.

Various types of detector have been proposed for detection of combustible fuel gases such as hydrogen. For example, Japanese Unexamined Patent Application Publication No. 2006-339080 (JP 2006-339080 A) discloses a combustion type hydrogen detector.

SUMMARY

However, in the combustion type hydrogen detector described in JP 2006-339080 A, since some time is required until the output of the hydrogen detector stabilizes after electric power is supplied thereto, supply of hydrogen may be held back until the output of the hydrogen detector stabilizes, or supply of hydrogen may occur sooner and the hydrogen detector be used with the possibility that the accuracy of hydrogen detection will be insufficient during the time until the output of the hydrogen detector stabilizes. It is difficult to achieve both rapidity and accuracy of hydrogen detection. This problem is not limited to hydrogen gas and can also occur in use of fuel gases.

The disclosure can be embodied in the following aspects.

According to a first aspect, a fuel gas supply control device is provided. The fuel gas supply control device includes: a fuel gas supply device that includes an electric valve that is electrically opened and shut off, the fuel gas supply device being configured to supply a fuel gas to a fuel gas consuming device configured to consume the fuel gas when the electric valve is open; a fuel gas sensor that has a predetermined unstable period until an accuracy of fuel gas detection reaches a predetermined level after the fuel gas sensor has been supplied with an electric power; and a control unit configured to cause the electric power to supply to the fuel gas sensor and to open the electric valve when starting of the fuel gas consuming device is instructed. Here, the control unit is configured to determine a temporary abnormality and to shut off the electric valve when a signal input from the fuel gas sensor exhibits a behavior of approaching a predetermined determination threshold value before the predetermined unstable period elapses and is configured to cancel the determination of the temporary abnormality and to open the electric valve when the signal from the fuel gas sensor is less than a predetermined determination value in a predetermined period after the electric valve has been shut off. With the fuel gas supply control device, supply of fuel gas can be rapidly started when starting of the fuel gas consuming device is instructed, and a temporary abnormality can be determined and supply of the fuel gas can be stopped when the signal input from the fuel gas sensor exhibits behavior of approaching the predetermined determination threshold value in the unstable period of the fuel gas sensor. Accordingly, even when a fuel gas sensor having an unstable period after supply of electric power has been started is used, it is possible to achieve both prompt supply of fuel gas to the fuel gas consuming device and rapid stopping of the supply of fuel gas when there is a likelihood of leakage of fuel gas.

In the fuel gas supply control device, the control unit may be configured to determine the temporary abnormality and to shut off the electric valve when the signal input from the fuel gas sensor exhibits the behavior of approaching the predetermined determination threshold value before the predetermined unstable period elapses in a state in which the electric power is being supplied to the fuel gas sensor and the electric valve is open after starting of the fuel gas consuming device is instructed and be configured to cancel the determination of the temporary abnormality and to open the electric valve when the signal is less than the predetermined determination value in the predetermined period after the electric valve has been shut off.

In the fuel gas supply control device, the control unit may be configured to maintain shut-off of the electric valve and to notify of an abnormality in supply of the fuel gas when the signal from the fuel gas sensor is equal to or greater than the predetermined determination value in the predetermined period after the temporary abnormality has been determined. According to this configuration, it is possible to promptly detect and notify of failure of the fuel gas sensor.

In the fuel gas supply control device, the fuel gas sensor may be a combustion type sensor, and the behavior in which the signal from the fuel gas sensor approaches predetermined the determination threshold value may be a behavior in which a magnitude of the signal increases. This is because the output signal of a combustion type sensor increases temporarily after supply of electric power thereto is started and then decreases to a level at which fuel gas is not detected.

In the fuel gas supply control device, the fuel gas may be hydrogen gas, the fuel gas sensor may be a hydrogen sensor, and the fuel gas consuming device may be an onboard fuel cell. This is because an onboard fuel cell requires to be started as rapidly as possible and there is a strong requirement for ensuring safety.

In the fuel gas supply control device, the control unit may be configured to shut off the electric valve when the control unit determined that the signal from the fuel gas sensor is greater than a predetermined detection threshold value after the predetermined unstable period has elapsed after the electric power has been supplied to the fuel gas sensor. According to this configuration, when leakage of fuel gas occurs, it is possible to satisfactorily stop supply of fuel gas.

According to a second aspect, there is provided a fuel gas supply control method. The fuel gas supply control method includes: supplying an electric power to a fuel gas sensor that has a predetermined unstable period until an accuracy of fuel gas detection reaches a predetermined level after the fuel gas sensor has been supplied with the electric power when starting of a fuel gas consuming device configured to consume a fuel gas is instructed; starting supply of the fuel gas from a fuel gas supply device to the fuel gas consuming device by opening an electric valve that is electrically opened and shut off; shutting off the electric valve when a signal from the fuel gas sensor exhibits behavior of approaching a predetermined determination threshold value before the predetermined unstable period has elapsed; and opening the electric valve when the signal from the fuel gas sensor is less than a predetermined determination value in a predetermined period after the electric valve has been shut off. Accordingly, the same operational advantages as in the fuel gas supply control device according to the first aspect can be achieved.

The fuel gas supply control method may further include maintaining shut-off of the electric valve and notifying of an abnormality in supply of the fuel gas when the signal from the fuel gas sensor is equal to or greater than the predetermined determination value in the predetermined period after the electric valve has been shut off.

According to a third aspect of the disclosure, there is provided a method of starting a fuel-cell vehicle in which a fuel cell is mounted. The starting method includes: supplying an electric power to a hydrogen sensor that has a predetermined unstable period until an accuracy of hydrogen detection reaches a predetermined level after the hydrogen sensor has been supplied with the electric power when an ignition switch is turned on; starting supply of a hydrogen gas from a hydrogen tank to the fuel cell by opening an electric valve that is electrically opened and shut off when the ignition switch is turned on; determining and recording a temporary abnormality and shutting off the electric valve when a signal from the hydrogen sensor exhibits behavior of approaching a predetermined determination threshold value before the predetermined unstable period has elapsed; cancelling the determination of the temporary abnormality and opening the electric valve when the signal from the hydrogen sensor is less than a predetermined determination value in a predetermined period after the electric valve has been shut off; and maintaining shut-off of the electric valve and notifying of an abnormality in supply of the hydrogen gas when the signal from the hydrogen sensor is equal to or greater than the predetermined determination value in the predetermined period after the temporary abnormality has been determined. According to this configuration, it is possible to rapidly perform supply of hydrogen to the fuel cell and determination of an abnormality based on the behavior in the unstable period of the hydrogen sensor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
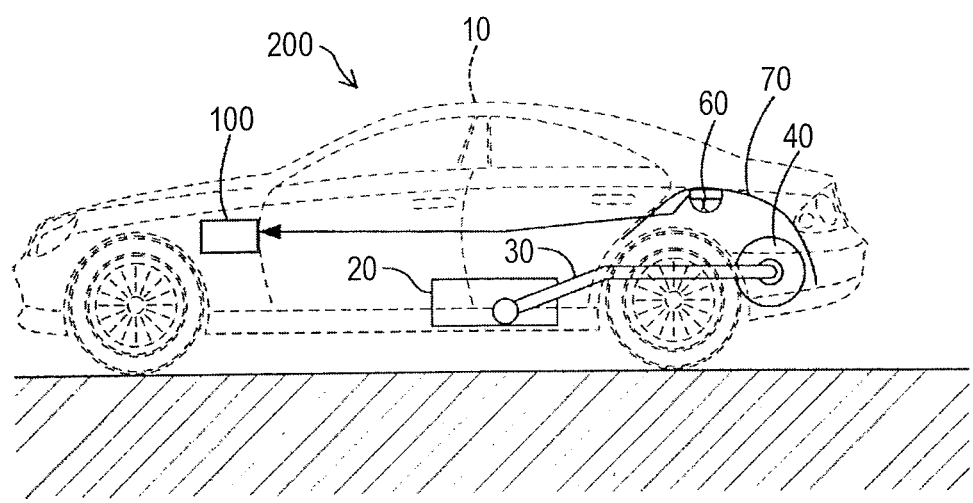
FIG. 1 is a diagram schematically illustrating a configuration of a vehicle in which a hydrogen supply control device according to a first embodiment is mounted.

A. Configuration of First Embodiment (1) Hardware Configuration Common to Embodiments FIG. 1 schematically illustrates a configuration of a vehicle 10 in which a hydrogen supply control device 200 which is a fuel gas supply control device according to an embodiment is mounted. In the vehicle 10, a fuel cell 20 that generates electric power by electrochemical reactions using hydrogen (hydrogen gas) which is a kind of fuel gas and oxygen (air), a hydrogen tank 40 that stores hydrogen which is supplied to the fuel cell 20 via a hydrogen pipe 30, a fuel cell ECU (hereinafter referred to as an FC ECU) 100 that takes charge of control of the fuel cell 20, a contact combustion type hydrogen sensor 60 that is installed in an accommodation chamber 70 in which the hydrogen tank 40 is accommodated, and the like are provided. The hydrogen sensor 60 is a type of fuel gas sensor. Control of supply of hydrogen and oxygen to the fuel cell 20 and discharge of off gas, control of coolant circulation which is not illustrated, control for driving an electric motor (not illustrated) serving as a vehicle drive source using generated electric power, and the like are known and thus will not be described.

Figure 2:
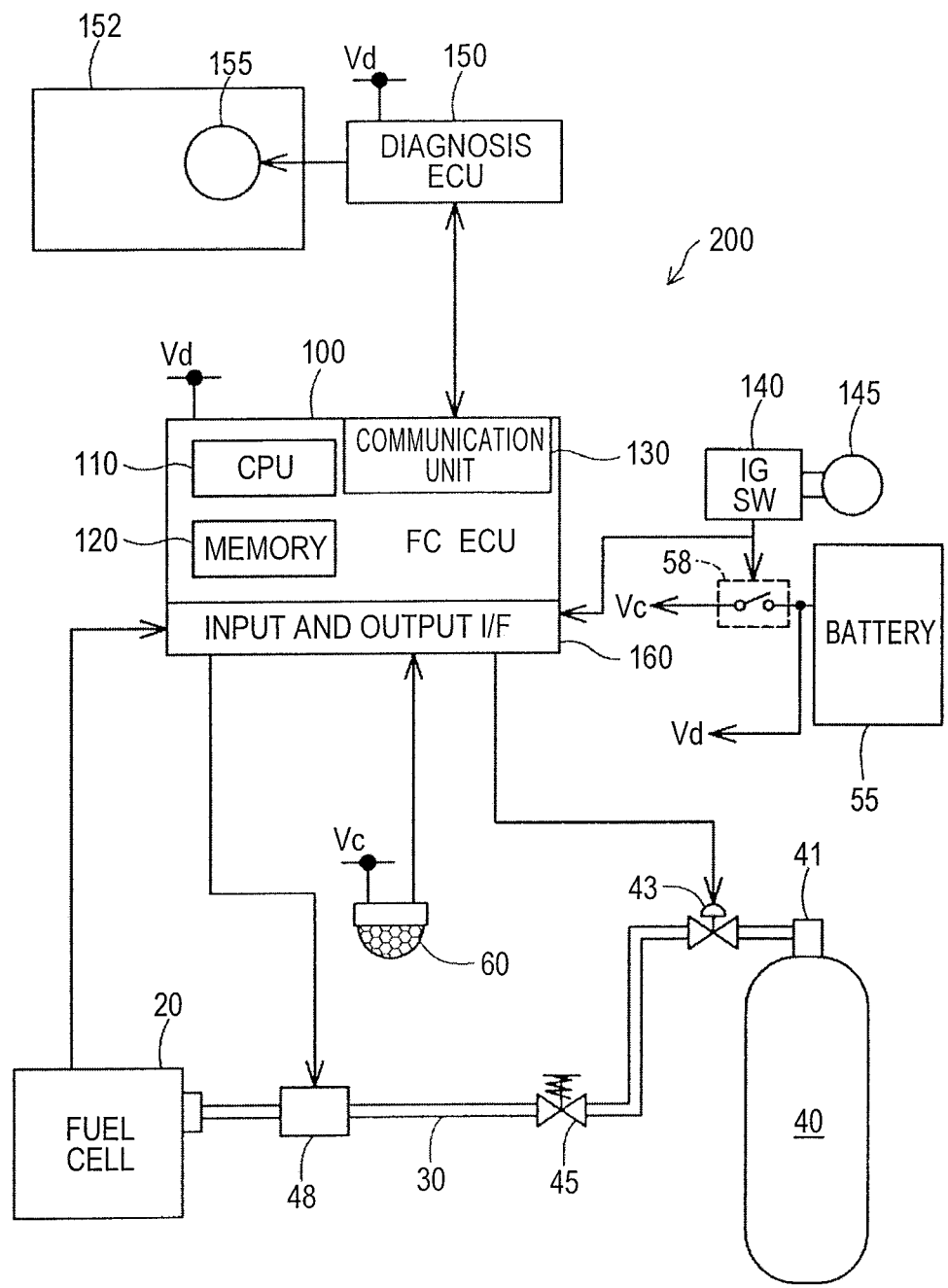
FIG. 2 is a diagram illustrating a configuration of a hydrogen supply control device.

FIG. 2 is a diagram mainly illustrating an electrical configuration of the hydrogen supply control device 200. As illustrated in the drawing, an end of the hydrogen pipe 30 that supplies hydrogen to the fuel cell 20 is connected to a cap 41 of the hydrogen tank 40 and the other end thereof is connected to the fuel cell 20. In the hydrogen pipe 30, a main electromagnetic valve 43 (electric valve) that opens and shuts off the hydrogen pipe 30 in response to an electrical signal from the hydrogen tank 40 side, a pressure control valve 45 that decreases and stabilizes a pressure of hydrogen which is supplied from the hydrogen tank 40, an injector 48 that opens a valve and supplies hydrogen to the fuel cell 20 in response to an instruction from the FC ECU 100, and the like are provided. In the actual fuel cell 20, a circulation passage that allows off gas which has been supplied to the fuel cell 20 but has not been used to be circulated in the hydrogen pipe 30 by a hydrogen gas pump (not illustrated) is formed, but is not illustrated in the drawing for the purpose of convenience of description.

An ignition switch 140 that causes a driver to explicitly instruct to start driving is provided in the vehicle 10. When a driver inserts a key 145 into the ignition switch 140 and turns the key, the ignition switch 140 is turned on and the relay 58 that is inserted into a power supply line of a battery 55 shuts off a contact. As a result, electric power is supplied from the battery 55 to a power supply line Vc connected to the hydrogen sensor 60. The FC ECU 100 or the diagnosis ECU 150 that receives and records data such as occurrence of an abnormality from the FC ECU 100 is supplied with electric power from the battery 55 via a direct power supply line Vd. A signal indicating that the ignition switch 140 has been turned on is also output to the FC ECU 100.

As illustrated in the drawing, the FC ECU 100 includes a central processing unit (CPU) 110 that controls all the processes, a memory 120 that stores programs or data, a communication unit 130 that communicates with the diagnosis ECU 150, and an input and output interface (I/F) 160 that transmits and receives signals to and from an external device. Various signals such as a signal from the ignition switch 140, a signal from the hydrogen sensor 60, and a coolant temperature from the fuel cell 20 are input to the input and output I/F 160. The input and output I/F 160 outputs a signal for driving the main electromagnetic valve 43, a signal for controlling the fuel cell 20, or the like.

The diagnosis ECU 150 is connected to the FC ECU 100 via a communication path (for example, a CAN) or the like and can receive a signal indicating failure or occurrence of an abnormality which is sent from the FC ECU 100. The diagnosis ECU 150 also turns on a warning lamp 155 which is provided in an instrument panel 152.

The hydrogen sensor 60 is connected to the input and output I/F 160 of the FC ECU 100. The hydrogen sensor 60 outputs a signal corresponding to a hydrogen concentration. An analog port that can directly read an analog signal is provided in the input and output I/F 160 of the FC ECU 100 and a signal from the hydrogen sensor 60 is supplied to this port. Accordingly, the CPU 110 can read a signal from the hydrogen sensor 60 via the port at any time.

(2) Hydrogen Supply Process

Supply of hydrogen to the fuel cell 20 by the hydrogen supply control device 200 in a normal state is performed as follows. (1) When the ignition switch 140 is turned on, the main electromagnetic valve 43 is driven and hydrogen gas can be supplied from the hydrogen tank 40. (2) A required power for the vehicle 10 is calculated, a required amount of generated power for the fuel cell 20 is determined based on the required power, and an amount of hydrogen with which the required amount of generated power can be generated is supplied from the hydrogen tank 40 to the fuel cell 20. Control of the supply amount is adjusted depending on a valve opening value and a valve opening time of the injector 48. Since a pressure of hydrogen which is supplied to the injector 48 is stabilized by the pressure control valve 45, an amount of hydrogen gas which is supplied to the fuel cell 20 can be accurately controlled using the valve opening value and the valve opening time of the injector 48. (3) When the hydrogen sensor 60 detects presence of equal to or greater than a predetermined amount of hydrogen, the FC ECU 100 detects a signal from the hydrogen sensor 60 and shuts off the main electromagnetic valve 43 to stop supply of hydrogen. This is referred to as normal control.

Figure 3:
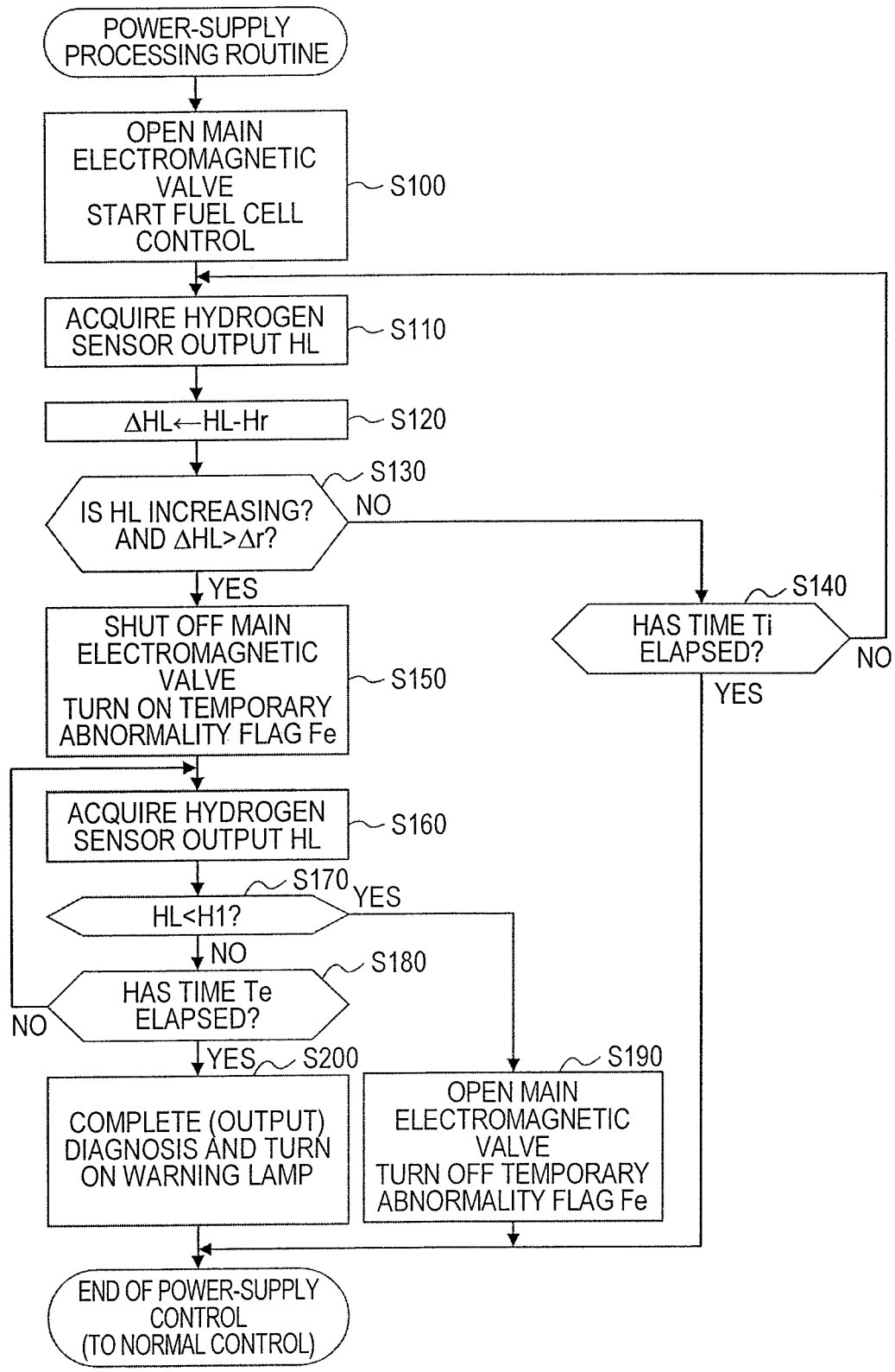
FIG. 3 is a flowchart illustrating a power-supply processing routine which is performed by an FC ECU which is a control unit.

A hydrogen supply process at the time of a supply of an electric power to the hydrogen sensor 60 will be described below. FIG. 3 is a flowchart illustrating a hydrogen supply process at the time of the supply of the electric power. This process is performed when the ignition switch 140 is turned on. As illustrated in FIG. 2, the FC ECU 100 is normally supplied with source power Vd from the battery 55 and is in an operable state, and the hydrogen sensor 60 is first supplied with source power Vc and starts its operation when the ignition switch 140 is turned on. It is known that the output of the contact combustion type hydrogen sensor 60 is unstable for a predetermined time after the electric power is supplied thereto. This is because a sensor that detects presence of a material such as hydrogen does not directly measure characteristics of a material such as electrical conductivity but generally measures characteristics using an interaction between a gas and the sensor side that detects presence of a gas such as combustion, oxidation, adsorption, or dispersion of fuel gas. In a contact combustion type hydrogen sensor, a side of an electrical resistor, which is assembled in a bridge shape, in contact with hydrogen gas is heated, but since some time is required until heating is completed and the bridge reaches an electrical equilibrium state, the output in the meantime is unstable and the output generally increases temporarily.

Therefore, when the ignition switch 140 is turned on, a signal from the ignition switch 140 is transmitted to the CPU 110 of the FC ECU 100 via the input and output I/F 160, and the CPU 110 starts a power-supply processing routine illustrated in FIG. 3. When the processing routine is started, the CPU 110 first opens the main electromagnetic valve 43 and starts control of the fuel cell 20 (Step S100). Control of the fuel cell 20 means that the valve opening time of the injector 48 is controlled such that a desired amount of hydrogen gas is supplied to the fuel cell 20, a compressor which is not illustrated is driven such that air is supplied to the fuel cell 20, and the fuel cell 20 starts generation of power at a desired amount of generated power.

Figure 4:
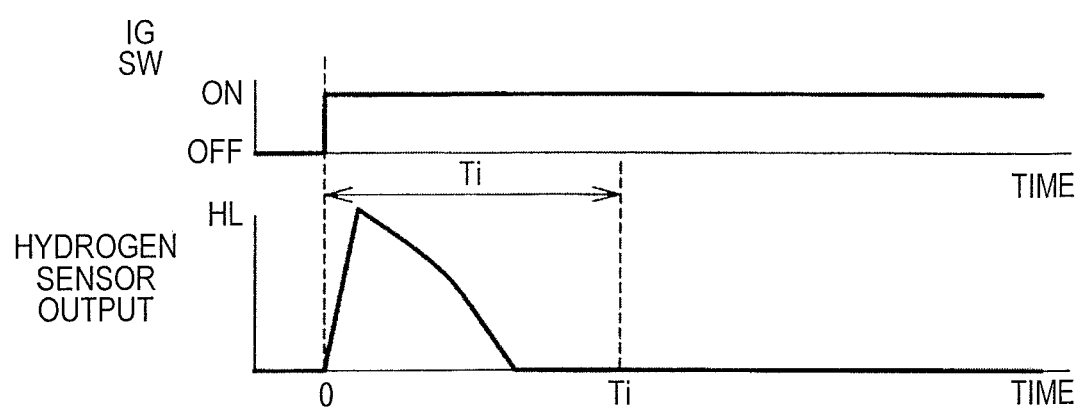
FIG. 4 is a diagram illustrating an output of a hydrogen sensor in a normal state.

Subsequently, the CPU 110 acquires an output HL of the hydrogen sensor 60 via the input and output I/F 160 (Step S110). As described above, the output of the hydrogen sensor 60 is unstable immediately after supply of source power Vc has been started, increases temporarily as illustrated in FIG. 4, and finally returns to zero. At least after a time Ti (an unstable period Ti) has elapsed, the output of the hydrogen sensor 60 returns to a value of 0 when there is no hydrogen. After acquiring the output HL of the hydrogen sensor 60, the CPU 110 performs a process of calculating a difference ΔHL between the output HL of the hydrogen sensor 60 and a predetermined value Hr (Step S120), and determines whether the output of the hydrogen sensor 60 has changed from decreasing to increasing and whether the calculated difference ΔHL is greater than a predetermined determination threshold value Δr (Step S130). Whether the output of the hydrogen sensor 60 has changed from decreasing to increasing is determined to distinguish an increase of the output from the temporary increase of the output value immediately after source power Vc has been supplied thereto, because the output of the hydrogen sensor 60 is likely to increase temporarily immediately after source power Vc is supplied thereto as illustrated in FIG. 4. Whether the difference ΔHL between the output HL of the hydrogen sensor 60 and the predetermined value Hr is greater than the determination threshold value Δr is determined by excluding cases in which an increase of the output of the hydrogen sensor 60 is small due to noise or the like.

When the output of the hydrogen sensor 60 changes from decreasing to increasing and the condition that the calculated difference ΔHL is greater than the determination threshold value Δr is not satisfied, the CPU 110 determines whether a time Ti has elapsed after source power has been supplied (Step S140), and repeatedly performs the processes of Steps S110 to S140 until the time Ti elapses. When the time Ti has elapsed in a state in which the output of the hydrogen sensor 60 has changed from decreasing to increasing and the condition that the calculated difference ΔHL is greater than the determination threshold value Δr is not satisfied, the CPU 110 determines that the hydrogen sensor 60 has started normally without detecting hydrogen, ends power-supply control, and transitions to normal control.

On the other hand, when it is determined that the output of the hydrogen sensor 60 has changed from decreasing to increasing and the condition that the calculated difference ΔHL is greater than the determination threshold value Δr is satisfied (YES in Step S130), the CPU 110 shuts off the main electromagnetic valve 43 at that time t1 (t1<Ti) and switches on a temporary abnormality flag Fe (Step S150). Cases in which the output of the hydrogen sensor 60 increases to a predetermined value or greater immediately after source power has been supplied to the hydrogen sensor 60 can include a case in which this is temporary behavior of the output of the hydrogen sensor 60 and a case in which the hydrogen sensor 60 is out of order. Another reason why the output of the hydrogen sensor 60 increases may be that hydrogen is leaking downstream from the main electromagnetic valve 43 by opening the main electromagnetic valve 43.

Figure 5:
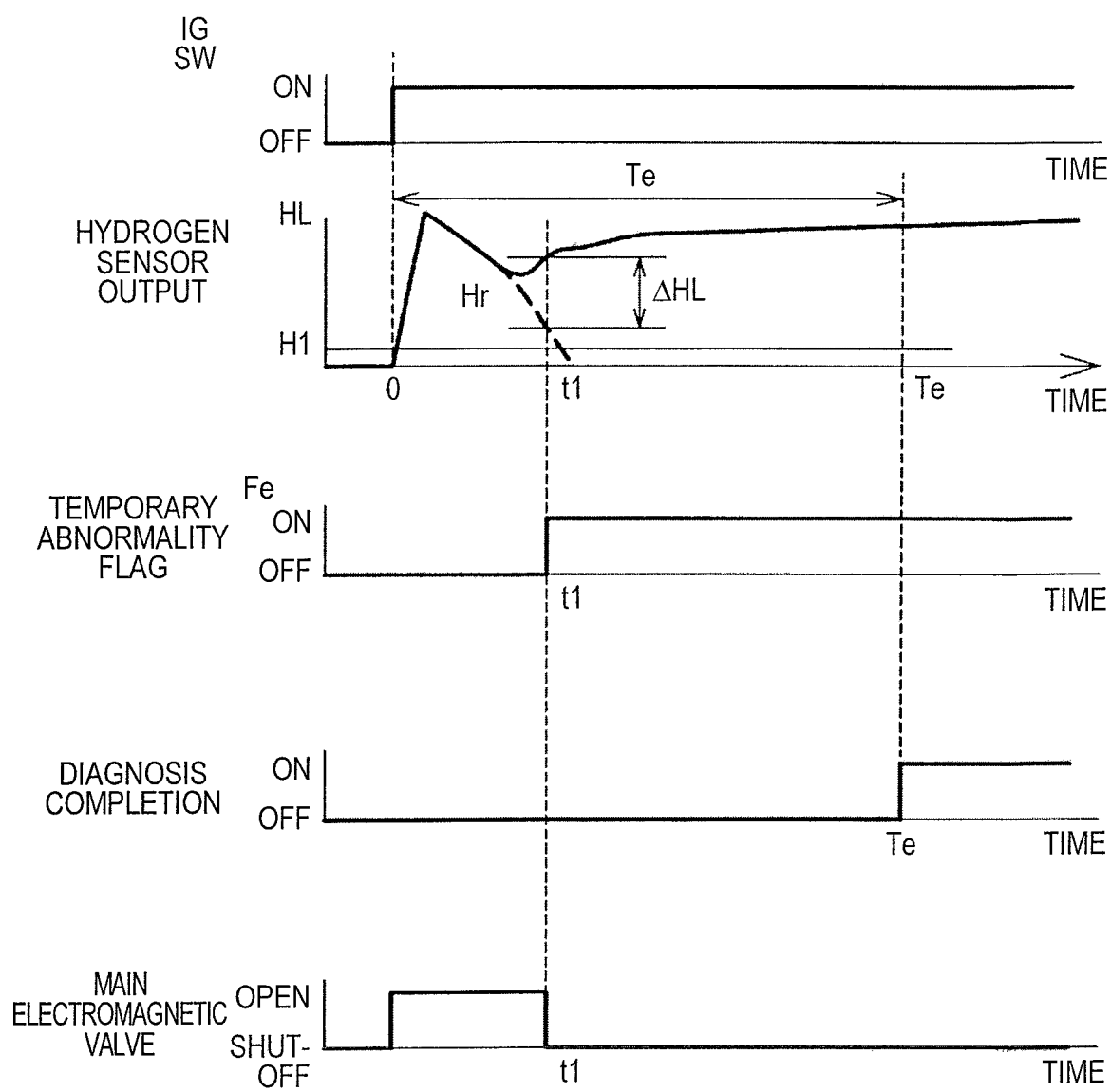
FIG. 5 is a diagram illustrating a time at which leakage of hydrogen is detected at the time of supply of electric power.
Figure 6:
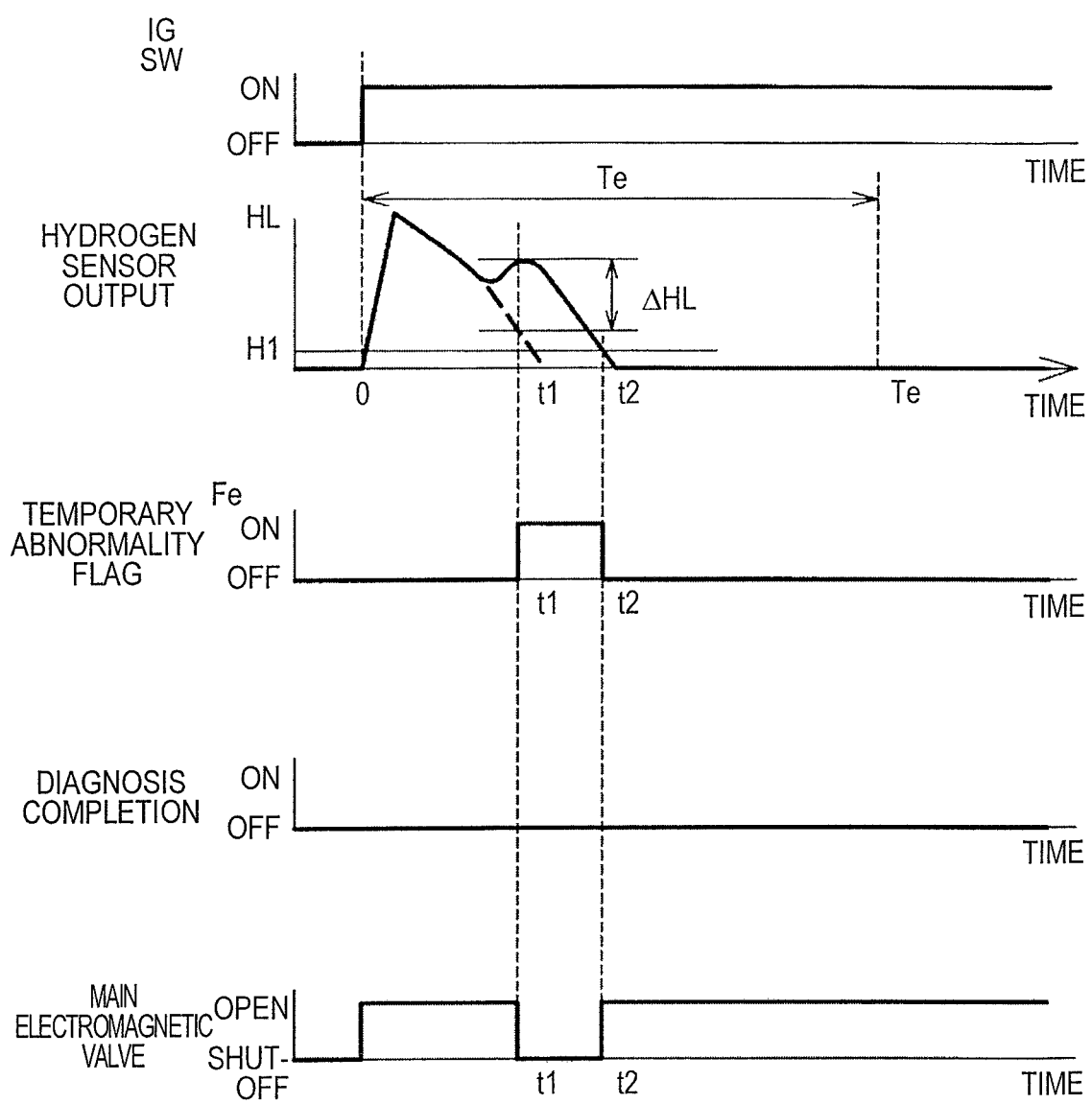
FIG. 6 is a diagram illustrating behavior of the hydrogen sensor at the time of supply of electric power.

When increase of the output HL of the hydrogen sensor 60 is due to failure of the hydrogen sensor 60, the main electromagnetic valve 43 is shut off (Step S150) since even if the possibility of leakage of hydrogen downstream from the main electromagnetic valve 43 is excluded, there is a high likelihood that the output of the hydrogen sensor 60 will not return to a normal value. On the other hand, when increase of the output HL of the hydrogen sensor 60 is due to temporary behavior of the output of the hydrogen sensor 60, there is a likelihood that the output of the hydrogen sensor 60 will return to a normal value when a predetermined time elapses. The former is illustrated in FIG. 5 and the latter is illustrated in FIG. 6.

In order to distinguish between these reasons, the FC ECU 100 additionally acquires the output HL of the hydrogen sensor 60 (Step S160) and determines whether the output HL is less than a determination value H1 (Step S170). The determination value H1 is set to a value at which it can be reliably determined that the hydrogen sensor 60 is not detecting hydrogen as illustrated in FIGS. 5 and 6. When it is determined that the output HL of the hydrogen sensor 60 is equal to or greater than the determination value H1 (No in Step S170), the CPU 110 determines whether a time Te has elapsed from when source power has been supplied (Step S180). When the time Te has not elapsed, the CPU 110 repeatedly performs the processes from acquisition of the output HL of the hydrogen sensor 60 in Step S160.

When the output HL of the hydrogen sensor 60 becomes less than the determination value H1 before the time Te has elapsed as the result of repetition of the processes (Steps S160 to S180) (time t2 in FIG. 6), the CPU 110 opens the main electromagnetic valve 43 and switches off the temporary abnormality flag Fe (Step S190). This is because the output HL of the hydrogen sensor 60 is restored to a normal output range over time. On the other hand, when the time Te has elapsed in a state in which the output HL of the hydrogen sensor 60 is not less than the determination value H1 as the result of repetition of the processes (Steps S160 to S180) (time Te in FIG. 5), the CPU 110 completes (outputs) diagnosis in a state in which the main electromagnetic valve 43 is shut off and the temporary abnormality flag Fe is maintained at the ON state (Step S200). As a result, the diagnosis ECU 150 turns on the warning lamp 155 of the instrument panel 152, that is, a caution lamp for notifying of occurrence of an abnormality. This is because the output HL of the hydrogen sensor 60 does not return to a normal value even when the time Te has elapsed.

The CPU 110 ends the power-supply control after the process of Step S190 or S200 has been performed. When the temporary abnormality flag Fe is returned to the OFF state (Step S190), the FC ECU 100 returns to normal control and continues to operate the fuel cell 20. On the other hand, when diagnosis is completed (Step S200), the FC ECU 100 determines that the hydrogen sensor 60 is out of order and stops operation of the fuel cell 20. In this case, limp home control for returning to a service station may be performed with electric power from the battery 55.

According to the first embodiment described above, when the ignition switch 140 is turned on, the FC ECU 100 can open the main electromagnetic valve 43 to supply hydrogen to the fuel cell 20 and can determine whether behavior of the output of the hydrogen sensor 60 similar to the output when leakage of hydrogen has been detected immediately after the electric power has been supplied to the hydrogen sensor 60 is due to failure of the hydrogen sensor 60 or temporary behavior of the output. Accordingly, when the behavior is due to failure of the hydrogen sensor 60, the diagnosis in which failure of the hydrogen sensor 60 has been detected can be completed. When the behavior is not due to failure of the hydrogen sensor 60, the main electromagnetic valve 43 can be opened to continuously supply hydrogen. That is, even when the hydrogen sensor 60 of a contact combustion type in which the output does not become a normal value immediately after source power has been supplied is used, it is possible to achieve both prompt supply of hydrogen to the fuel cell 20 (particularly, in the period from time 0 at which the ignition switch 140 is turned on to time t1 as illustrated in the drawings) and reliable detection of failure of the hydrogen sensor 60 (time Te).

B. Second Embodiment

Figure 7:
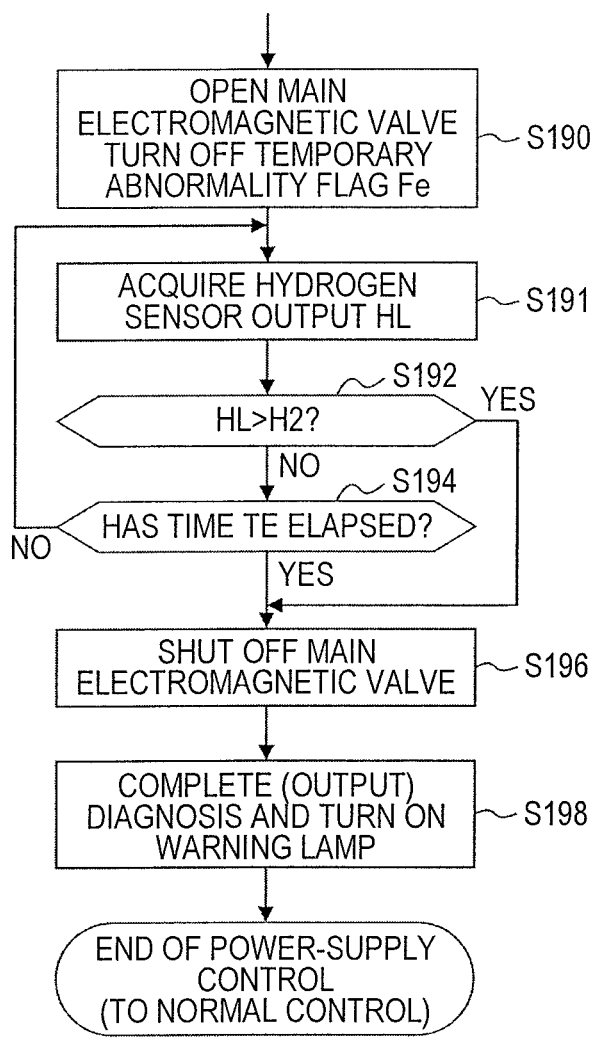
FIG. 7 is a flowchart illustrating principal parts of control in a second embodiment.
Figure 8:
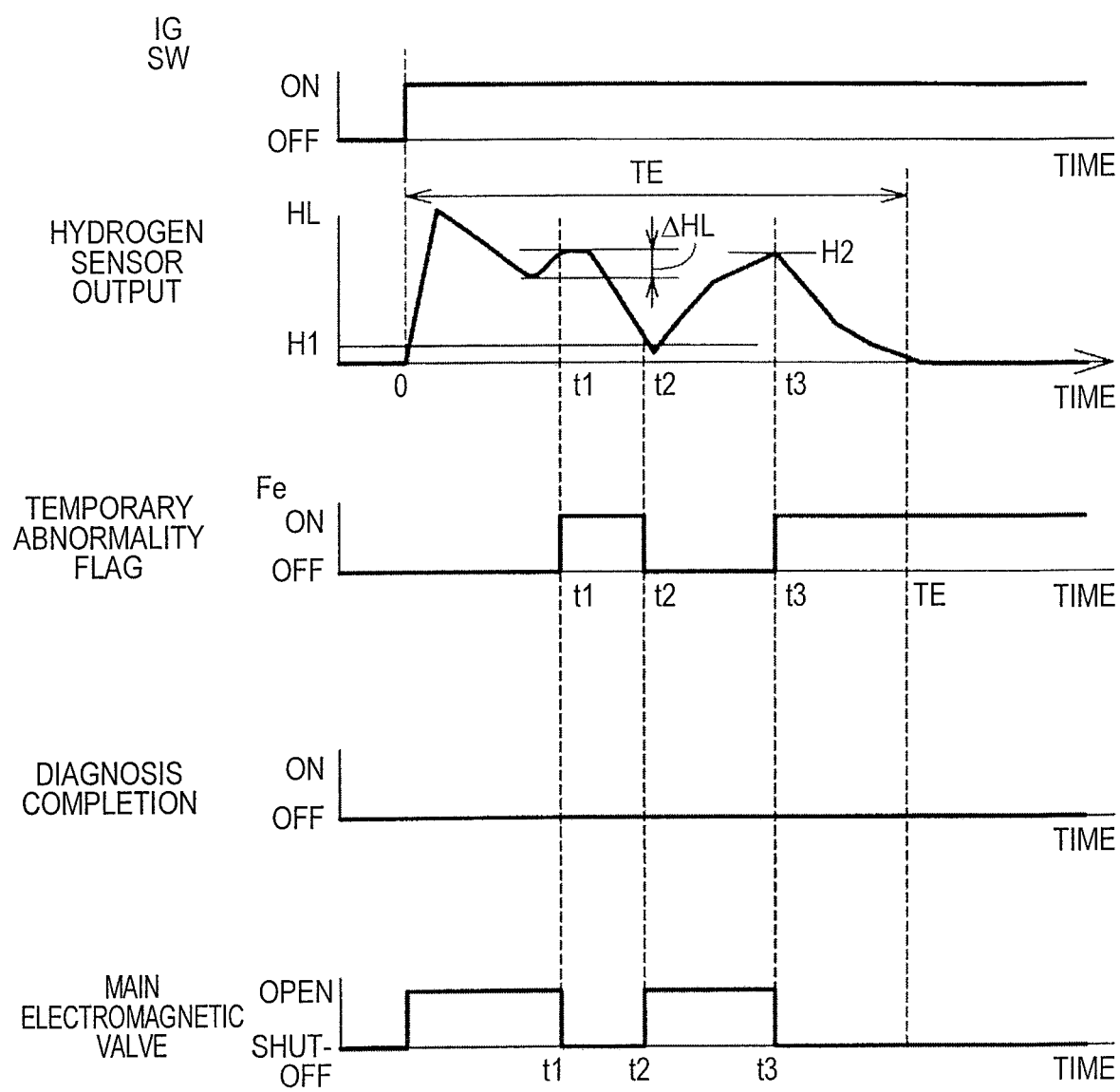
FIG. 8 is a diagram illustrating a time at which leakage of hydrogen is detected by a hydrogen sensor according to the second embodiment.

A second embodiment will be described below. In the second embodiment, the processes of Steps S191 to S198 are additionally performed after Step S190 in the first embodiment (FIG. 3) as illustrated in FIG. 7. The other configurations are the same as in the first embodiment and thus description thereof will not be repeated. Change of the output HL of the hydrogen sensor 60, operation of the main electromagnetic valve 43, and the like in the second embodiment are illustrated in FIG. 8.

In the second embodiment, similarly to the first embodiment, the FC ECU 100 switches the temporary abnormality flag Fe to the ON state and additionally shuts off the main electromagnetic valve 43, when the output HL of the hydrogen sensor 60 changes from decreasing to increasing and the difference ΔHL temporarily becomes greater than the determination threshold value Δr. Thereafter, when the output HL of the hydrogen sensor 60 becomes equal to or less than the determination value H1 before the time Te elapses as the result of repetition of the processes of Steps S160 to S180 in FIG. 3 (time t2 in FIG. 8), the FC ECU 100 opens the main electromagnetic valve 43 and switches the temporary abnormality flag Fe to the OFF state (Step S190).

In the second embodiment, thereafter, acquisition of the output HL of the hydrogen sensor 60 (Step S191), determination of whether the output HL is greater than the detection threshold value H2 for hydrogen (Step S192), and elapse of the time TE (Step S194) are repeated. This is for detecting leakage of hydrogen during the power-supply control when the output HL of the hydrogen sensor 60 increases immediately after source power has been supplied thereto is due to leakage of hydrogen. When the output HL of the hydrogen sensor 60 changes from decreasing to increasing and the value thereof is sufficiently high (ΔHL>Δr), the FC ECU 100 determines that there is a likelihood of failure of the hydrogen sensor 60 and temporarily shuts off the main electromagnetic valve 43. Thereafter, when the output HL of the hydrogen sensor 60 becomes less than the determination value H1, the FC ECU 100 determines that the hydrogen sensor 60 has not failed, switches the temporary abnormality flag Fe to the OFF state, and opens the main electromagnetic valve 43 (Step S190).

When the output HL of the hydrogen sensor 60 increases and becomes greater than the detection threshold value H2 before the time TE elapses during the subsequent processes (Steps S191 to S194), the FC ECU 100 determines that leakage of hydrogen has occurred (Step S192), shuts off the main electromagnetic valve 43 again (Step S196), completes diagnosis for leakage of hydrogen, outputs the result thereof to the diagnosis ECU 150, and turns on a caution lamp (Step S198). As a result, when the phenomenon in which the output HL of the hydrogen sensor 60 immediately after source power has been supplied to the hydrogen sensor 60 changes from decreasing to increasing and the difference ΔHL temporarily becomes greater than the determination threshold value Δr is due to actual leakage of hydrogen, the FC ECU 100 detects leakage of hydrogen promptly, shuts off the main electromagnetic valve 43, and outputs the diagnosis result to the diagnosis ECU 150 or notifies a driver. Accordingly, in addition to the operational advantages of the first embodiment, it is possible to appropriately cope with actual leakage of hydrogen.

C. Other Embodiments

In the above-mentioned embodiments, hydrogen is used as fuel gas, but a fuel gas other than hydrogen, for example, other fuel gases such as methane gas or butane gas, can be used. Similarly to hydrogen, such fuel gases can be measured using an interaction between a fuel gas and a sensor side detecting the presence of a fuel gas such as combustion, oxidation, adsorption, or dispersion of a fuel gas and can be handled in the same way. Specifically, in the above-mentioned embodiments, the contact combustion type hydrogen sensor 60 is used, but another type of hydrogen sensor may be employed. For example, a semiconductor type hydrogen sensor or a catalytic combustion type sensor may be employed. In these different types of hydrogen sensor, what the behavior of a signal from the hydrogen sensor in the unstable period is like depends on the sensor. In a sensor having a predetermined unstable period before the accuracy of hydrogen detection reaches a predetermined level after source power has been supplied thereto, the detection threshold value can be determined on the assumption of a case in which the same behavior as when detecting hydrogen is exhibited in the meantime. For example, when the output decreases due to the presence of hydrogen in the unstable period, the decrease can be detected and supply of hydrogen can be temporarily stopped.

In the above-mentioned embodiments, the output of the hydrogen sensor is an analog signal, which is received via the analog input port of the control unit, is analog-to-digital converted, and is then input, but when the output of the hydrogen sensor is a frequency or a duty ratio of a digital signal, the signal may be received via a digital input port. Exchange of signals between the hydrogen sensor and the control unit may be performed directly via a signal line or may be performed using an onboard LAN (CAN) or the like. Alternatively, signals may be exchanged by radio communication such as Bluetooth (registered trademark) or WiFi (registered trademark). Similarly, exchange of signals between the control unit and the electric valve may be performed using various methods including the above-mentioned examples.

In the above-mentioned embodiments, the condition that the difference ΔHL between the output HL of the hydrogen sensor and the predetermined value Hr is greater than the determination threshold value Δr is used to detect that a signal input from the hydrogen sensor exhibits behavior of approaching a predetermined determination threshold value before the unstable period has elapsed, but a condition that the output HL has changed to increasing can simply be used for detection. Alternatively, a condition that the output HL instead of the difference ΔHL is greater than the determination threshold value can simply be used for detection.

In the above-mentioned embodiments, the hydrogen supply control device has a configuration in which an onboard fuel cell is used as the hydrogen consuming device and hydrogen is supplied thereto, but the disclosure is not limited to an onboard fuel cell and may be a control device that supplies hydrogen to a stationary fuel cell or the like. Alternatively, the disclosure is not limited to a fuel cell and may be a control device that supplies hydrogen to a hydrogen-combustion engine or the like that combusts hydrogen. Alternatively, the disclosure may be embodied as a method of starting a fuel-cell vehicle.

Although the unstable period of the hydrogen sensor, the period until the detection accuracy of the hydrogen sensor reaches a predetermined level after the electric valve has been shut off, or the like is determined using time in the above-mentioned embodiments, it may be defined using another parameter such as a period until an amount of hydrogen supplied to the hydrogen consuming device reaches a predetermined amount.

In the above-mentioned embodiments, an electromagnetic valve is used as an electric valve, but an electric valve which is driven by a motor may be employed. The control unit employs digital control using a CPU, but may be embodied by a relay sequence or the like.

The disclosure is not limited to the above-mentioned embodiments and can be embodied in various forms without departing from the gist of the disclosure. For example, technical features of the embodiments corresponding to technical features of the aspects described in the SUMMARY can be appropriately exchanged or combined to solve a part or all of the above-mentioned problems or to achieve a part or all of the above-mentioned advantages. The technical features can be appropriately deleted as long as they are not described as being essential in this specification. For example, a part of a configuration which is embodied by hardware in the embodiments may be embodied by software. At least a part of a configuration which is embodied by software may be embodied by discrete circuit configurations.

What is claimed is:
1. A fuel gas supply control device comprising:
a fuel gas supply device that includes an electric valve that is electrically opened and shut off, the fuel gas supply device being configured to supply a fuel gas to a fuel gas consuming device configured to consume the fuel gas when the electric valve is open;
a fuel gas sensor that has a predetermined unstable period until an accuracy of fuel gas detection reaches a predetermined level after the fuel gas sensor has been supplied with an electric power; and a control unit configured to
  (i) cause the electric power to be supplied to the fuel gas sensor and open the electric valve when starting of the fuel gas consuming device is instructed,
  (ii) determine a temporary abnormality of the fuel gas sensor and shut off the electric valve to temporarily stop the supply of the fuel gas to the fuel gas consuming device when a signal input from the fuel gas sensor is greater than a predetermined determination threshold value before the predetermined unstable period elapses and
  (iii) cancel the determination of the temporary abnormality and open the electric valve when the signal from the fuel gas sensor is not greater than the predetermined determination threshold value in a predetermined period after the electric valve has been shut off.

2. The fuel gas supply control device according to claim 1, wherein the control unit is configured to determine the temporary abnormality and to shut off the electric valve when the signal input from the fuel gas sensor is greater than the predetermined determination threshold value before the predetermined unstable period elapses in a state in which the electric power is being supplied to the fuel gas sensor and the electric valve is open after starting of the fuel gas consuming device is instructed and is configured to cancel the determination of the temporary abnormality and to open the electric valve when the signal is not greater than the predetermined determination value in the predetermined period after the electric valve has been shut off.

3. The fuel gas supply control device according to claim 1, wherein the control unit is configured to maintain shut-off of the electric valve and to notify of an abnormality in supply of the fuel gas when the signal from the fuel gas sensor is equal to or greater than the predetermined determination value in the predetermined period after the temporary abnormality has been determined.

4. The fuel gas supply control device according to claim 1,
  wherein the fuel gas sensor is a combustion type sensor, and
  wherein the behavior in which the signal from the fuel gas sensor approaches the predetermined determination threshold value is a behavior in which a magnitude of the signal increases.

5. The fuel gas supply control device according to claim 1,
  wherein the fuel gas is a hydrogen gas,
  wherein the fuel gas sensor is a hydrogen sensor, and
  wherein the fuel gas consuming device is an onboard fuel cell.

6. The fuel gas supply control device according to claim 1, wherein the control unit is configured to shut off the electric valve when the control unit determined that the signal from the fuel gas sensor is greater than a predetermined detection threshold value after the predetermined unstable period has elapsed after the electric power has been supplied to the fuel gas sensor.

7. A fuel gas supply control method comprising:
  providing the fuel gas supply control device according to claim 1;
  supplying the electric power to the fuel gas sensor that has the predetermined unstable period until the accuracy of fuel gas detection reaches the predetermined level after the fuel gas sensor has been supplied with the electric power when starting of the fuel gas consuming device configured to consume the fuel gas is instructed;
  starting supply of the fuel gas from the fuel gas supply device to the fuel gas consuming device by opening the electric valve that is electrically opened and shut off;
  shutting off the electric valve when the signal from the fuel gas sensor is greater than the predetermined determination threshold value before the predetermined unstable period has elapsed; and
  opening the electric valve when the signal from the fuel gas sensor is not greater than the predetermined determination value in the predetermined period after the electric valve has been shut off.

8. The fuel gas supply control method according to claim 7, further comprising maintaining shut-off of the electric valve and notifying of an abnormality in supply of the fuel gas when the signal from the fuel gas sensor is equal to or greater than the predetermined determination value in the predetermined period after the electric valve has been shut off.

9. A method of starting a fuel-cell vehicle in which a fuel cell is mounted, the method comprising:
  providing the fuel gas supply control device according to claim 1, wherein the fuel gas sensor is a hydrogen sensor that has the predetermined unstable period until an accuracy of hydrogen detection reaches the predetermined level after the hydrogen sensor has been supplied with the electric power;
  supplying the electric power to the hydrogen sensor that has the predetermined unstable period until the accuracy of hydrogen detection reaches the predetermined level after the hydrogen sensor has been supplied with the electric power when an ignition switch is turned on;
  starting supply of a hydrogen gas from a hydrogen tank to the fuel cell by opening the electric valve that is electrically opened and shut off;
  determining and recording a temporary abnormality and shutting off the electric valve when a signal from the hydrogen sensor exhibits the behavior of approaching the predetermined determination threshold value before the predetermined unstable period has elapsed;
  cancelling the determination of the temporary abnormality and opening the electric valve when the signal from the hydrogen sensor is less than the predetermined determination value in the predetermined period after the electric valve has been shut off; and
  maintaining shut-off of the electric valve and notifying of an abnormality in supply of the hydrogen gas when the signal from the hydrogen sensor is equal to or greater than the predetermined determination value in the predetermined period after the temporary abnormality has been determined.

* * * * *